Figure 4:
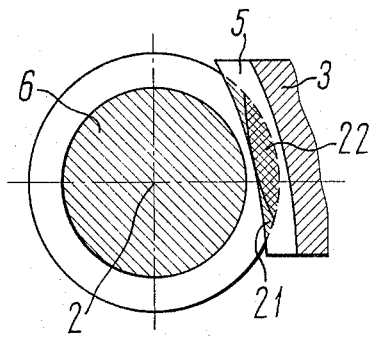

United States Patent Office 3,289,489
Patented Dec. 6, 1966

3,289,489
ORTHOGONAL WORM-BEVEL GEARING
Anatoly Konstantinovich Georgiev, Izhevsk, U.S.S.R., assignor to Izhevsky Mekhanichesky Institute, Izhevsk, U.S.S.R.
Filed June 1, 1964, Ser. No. 371,590
6 Claims. (Cl. 74—427)

This invention relates to toothed gearings with meshing members whose axes are neither parallel nor in the same plane, in particular, the invention relates to orthogonal worm-bevel gearing, also referred to as skew axis gearing.

Such gearings are used in machine-tool construction, the car industry, the manufacturing of reduction gears and in other branches of engineering, particularly where there is need for compact toothed gearings which have high reduction ratios and are readily adjustable for backlash.

There are known external orthogonal worm-bevel gearings, in which the meshing portion of the worm is in the form of a frustum having threads of constant axial pitch, said frustum facing the common perpendicular to the worm and gear axes with its smaller base whereas the wheel teeth are formed on the external surface of an obtuse cone by means of a tool reproducing the shape, relative position and relative motion of the worm.

These known gearings involve the following disadvantages:

The field of action in these gearings, i.e. the space within which the worm thread can contact the wheel teeth is extended axially in the longitudinal direction of the worm, i.e., in the direction of the worm axis and is substantially smaller in cross sections perpendicular to the worm axis. This results in an enlarged specific pressure between meshing elements and reduction in efficiency and load capacity of the gearings.

Apart from this, with the commonly used design of a shaft having two bearings, these drives do not allow a maximum force to be obtained from utilizing two bearings instead of one, the reason being as follows. One of the two bearings of the worm shaft is closer to the meshing portion of the worm (let it be called the nearer bearing), than the other bearing (let it be called the farther bearing). The shaft section connecting the worm with the farther bearing initiates from the smaller base of the frustum, i.e. the meshing portion of the worm engages the teeth of the wheel at distances which are closest to the worm axis. Owing to this, the part of the worm shaft which is farthest from the bearings is of smallest diameter which results in greatest stress. Preferably from a point of view of uniform strength and higher rigidity, it is desirable that the portion furthest from the bearings be of maximum section.

Since the worm shaft with two bearings in the conventional worm-bevel gearings cannot be made in the form close to that which provides uniform strength and high rigidity, these gearings are characterized by lower load capacity.

The object of this invention is to eliminate the above disadvantages.

This is achieved by employing an orthogonal worm-bevel gearing comprising a tapered worm and a face-type gear, in which the meshing portions of the worm and gear are located between the apex of the worm cone and the plane which intersects the axis of the gear normal to the axis of the worm, the meshing portion of the worm having its larger base closer to the plane intersecting the axis of the gear normal to the worm axis, the gear teeth being disposed on the internal surface of the gear, said teeth being made by means of a tool such as a hob for reproducing the shape, relative position and relative motion of the worm.

The meshing portion of the worm in this gearing is arranged not closer to the common perpendicular to the worm and gear axes than a plane perpendicular to the worm axis and passing through the point nearest to the wheel axis, this point being on the line of tangency of the worm frustum and the surface of rotation around the wheel axis enveloping the worm.

To avoid large fillets or, even, partial cutting of the wheel teeth the axial pitch [$t$] of the worm thread in this gearing, and, consequently, in the tool reproducing can be determined from the formula:

$$t = \frac{t' + t''}{2}$$

where $$t' = \frac{2\pi A}{n\left(\dfrac{i}{a'} - b^{i}\right)}$$

and $$t'' = \frac{2\pi A}{n\left(\dfrac{1}{a''} - b''\right)}$$

whereas $a'$, $b'$, $a''$ and $b''$ are determined from the following equations:

$$a^{1} = \frac{Z^{1}}{Z^{1} - (r - Z^{1} \tan \delta_{1}) \tan \delta_{1}}$$

$$b^{1} = \frac{\{[Z^{1} - (r - Z^{1} \tan \delta_{1}) \tan \delta_{1}]^{2} - A^{2} \tan^{2} \delta_{1}\}^{1/2}}{r - Z^{1} \tan \delta_{1}}$$

$$a'' = \frac{Z}{Z'' - (r - Z'' \tan \delta_{1}) \tan \delta_{1}}$$

$$b'' = \frac{\{[Z'' - (r - Z'' \tan \delta_{1}) \tan \delta_{1}]^{2} - A^{2} \tan^{2} \delta_{1}\}^{1/2}}{r - Z'' \tan \delta_{1}}$$

where

[$i$] is the ratio between the number of the wheel teeth and the number of the worm threads;
$A$ is the centre-to-centre distance of the gearing;
$n$ is the number of the worm threads;
$\delta_{1}$ is one-half angle at the apex of the cone of the worm wheel;
$r$ is the distance from the point, where the worm frustum surface intersects the common perpendicular, to the worm axis, in other words, a radius of the circle which is formed at the intersection of the worm and a plane perpendicular to the worm axis and passing through the common perpendicular to the worm and gear axes.
$Z'$ and $Z''$ are the respective distances between the common perpendicular and the planes perpendicular to the worm axis at the ends of larger and smaller diameter respectively.

Figure 1:
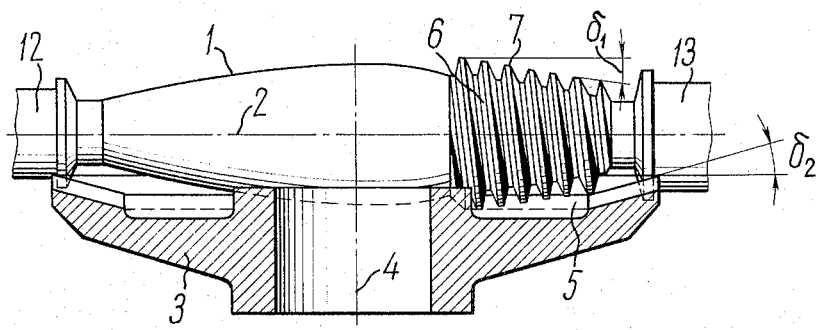
Figure 2:
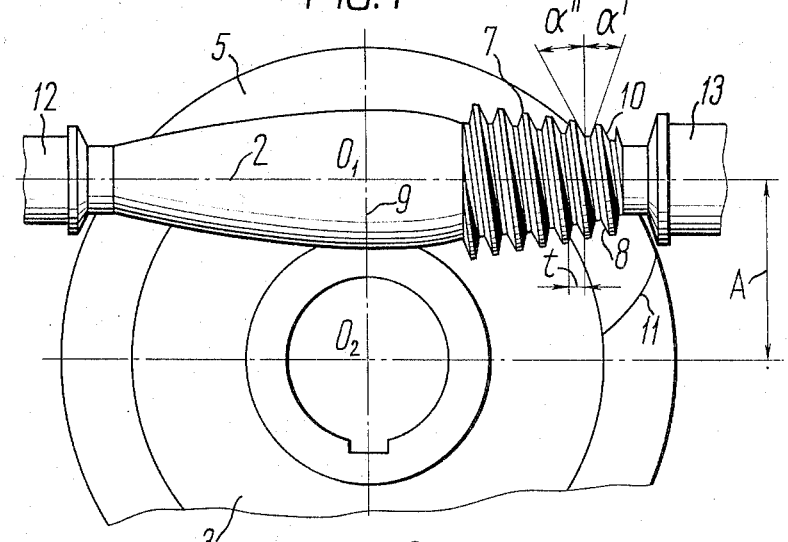
Figure 3:
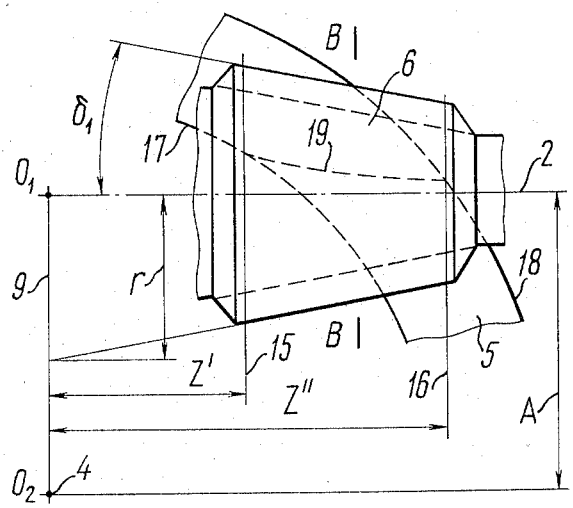
Figure 5:
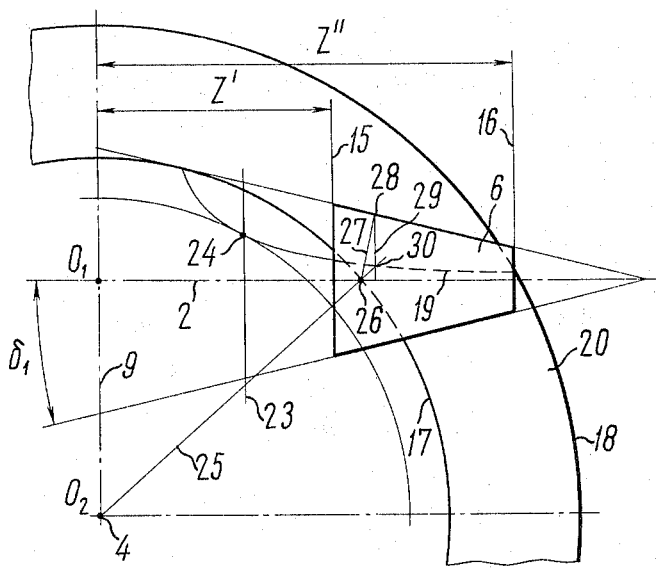
Figure 6:
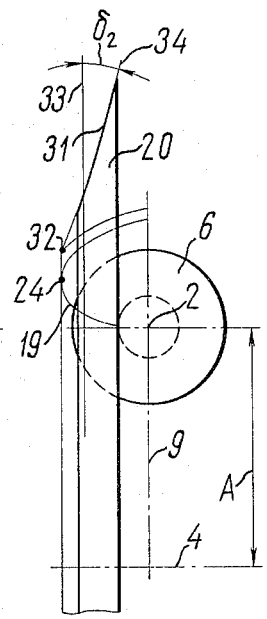

The invention will be described in detail with regard to the following description taken in conjunction with the appended drawings in which:

FIG. 1 is the view of the gearing according to the invention as viewed along the perpendicular common to the axes of the worm and gear;
FIG. 2 is the view of the gearing of FIG. 1 along the axis of the gear therein;
FIG. 3 is an enlarged diagrammatic view of the meshing portions of the worm and gear of FIG. 1;
FIG. 4 is a section along the line B—B in FIG. 3;
FIG. 5 is a diagrammatic top view of the gearing, and
FIG. 6 is a side elevation view of the gearing in FIG. 5.

The gearing comprises a worm 1, with axis 2 and worm wheel 3 with axis 4 and tooth crown 5. The meshing portion 6 of the worm is made in the form of a frustum which is provided with threads 7. Each thread has a front face 8, which is disposed closer toward common perpendicular 9 of the gearing as compared to opposite or rear face 10. Front faces 8 of each thread face the larger diameter of the worm frustum whereas rear faces 10 face the smaller diameter of the worm frustum.

The angle $\alpha^1$ of the front side 8 which is formed between said 8 and the plane perpendicular to the form axis is within 0–30°. The angle $\alpha''$ of back side 10 is between 20° and 50° respectively. The most commonly used values of $\alpha'$ are 10° to 20° and those of $\alpha''$ 25° to 35°.

One-half the angle of the worm cone apex, i.e. the angle $\delta_1$ is usually 4° to 12°. The teeth of crown 5 are formed as the internal surface of a cone by a tool reproducing the worm as to its shape, relative position and relative motion. Therefore, line 11 of the wheel teeth and the wheel teeth profile are governed by the worm's shape, relative position and relative motion.

Owing to the fact that the frustum of meshing portion 6 of the worm faces common perpendicular 9 with its larger base and wheel 3 is cup-shaped, the portion of the worm shaft which is farthest from its bearings 12 and 13 is of greatest diameter and, consequently, the shaft has a form ensuring its greatest strength and highest rigidity in the region of maximum stress. This allows the larger loads to be transmitted without running a risk of any violation of proper meshing which is likely to arise due to the strains in the worm shaft.

Lines 15 and 16 seen in FIG. 3 are the traces of the planes perpendicular to axis 2 of the worm. They are drawn through the intersection points of cylinders 17 and 18, which are coaxial with the wheel and limit the tooth crown of the latter, and line 19 is the locus of the line of contact between the conical surface of the worm 1 and the surface 20 of rotation enveloping the worm, said surface having a common axis with wheel axis 4.

FIG. 4 shows area 21 of the cross section of the field of action which is crosshatched from left to right and from top to bottom. To provide a comparison, there is also a perpendicular crosshatching of portion 22 of the cross section of the field of conjugate action which characterizes such a contact area of a size similar to that of the bevel wormgearing with external meshing.

Owing to the larger contact area in the gearing of the invention the total length of the contacting lines increases and the specific pressure in the zone of meshing decreases which results in larger loading capacity and higher efficiency of the gearing.

The meshing portion 6 of the worm is arranged further from the common perpendicular to the worm and gear axes (the point $0_1$ where worm axis 2 and the common perpendicular 9 intersect) than the plane perpendicular to worm axis 2, trace 23 of the plane being shown in FIG. 5. Since wheel axis 4 is perpendicular to the plane of the drawing shown in FIG. 5, this figure is used to determine point 24 nearest to the wheel axis, said point being on line 19 of tangency of the worm frustum and surface 20 of rotation around the wheel axis 4 enveloping the worm.

Line 19 can be plotted graphically. Through the point $0_2$ which is a projection of the wheel axis 4 on the drawing plane, a straight line 25 is drawn. From point 26, which is the point where this line intersects worm axis 2, perpendicular 27 is constructed to the worm cone generatrix. Through point 28, which is the point where perpendicular 27 intersects the cone generatrix, straight line 29 is drawn which is perpendicular to worm axis 2. Point 30 where straight lines 25 and 29 intersect is a point on line 19. The rest of the points of line 19 can be found in a similar way.

FIG. 6 shows the location of line 19 when it is projected on a plane which is perpendicular to worm axis 2. The figure also shows curve 31 of the axial section of enveloping surface 20. Point 32 which lies on curve 31 corresponds to point 24 and is the nearest to the wheel axis of the axial section of surface 20.

An angle $\delta_2$ between the generatrix of the addendum cone and the plane perpendicular to its axis is assumed to be an angle between trace 33 of said plane and line 34 tangential of the upper branch of the curve at its medium section.

In most cases the angle $\delta_2$ is about one and a half times as large as the angle $\delta_1$.

The axial pitch $t$ is found from the above-mentioned formula.

Owing to it being constant as well as to the conicity of the worm and the wheels, the backlash in meshing is taken up by means of the worm travelling along its axis in the direction from the nearest distance of the gearing. This is done without interfering with the proper mode of meshing.

The worm with the same meshing portion and the counterpart corresponding tool can be in some instances used for the gearings which differ in their sizes and ratios.

When doing so and knowing the sizes, position and pitch $t$ of the worm, the ratio $i$ can be, for example, found from the following formula shown hereunder where $a'$, $b'$, $a''$ and $B''$ are of the values equal to those in the previous case. The value obtained from the formula is rounded off to the nearest ratio which is possible with the given starts of the worm.

The gearing is made with ratios 10 to 500.

The formula for determining the ratio $i$:

$$i = \frac{i' + i''}{2}$$

where $$i' = a^1 \left( \frac{2\pi A}{tn} + b' \right)$$

and $$i'' = a'' \left( \frac{2\pi A}{tn} + b'' \right)$$

What I claim is:

1. A right angle skew axis gearing comprising a conically tapered worm having a thread of constant axial lead, and a face-type worm gear having an axis, said gear including teeth meshing with the thread of said worm, the meshing portions of said worm and gear being positioned between the apex of the conical surface of said worm and a plane which is coincident with the axis of said gear and extends normal to the axis of said worm.

2. A right angle skew axis gearing as set forth in claim 1 wherein the worm has a cone angle which ranges from 8° to 24°.

3. A right angle skew axis gearing as set forth in claim 1 wherein the side of the thread of the worm facing the larger diameter of said worm has an angle ranging from 0° to 30°.

4. A right angle skew axis gearing as set forth in claim 1 wherein the side of the thread of the worm facing the smaller diameter of said worm has an angle ranging from 20° to 50°.

5. A right angle skew axis gearing comprising a conically tapered worm having a thread of constant axial lead, and a face-type worm gear having an axis, said gear including teeth meshing with the thread of said worm, the meshing portions of said worm and gear being positioned between the apex of the conical surface of said worm and a plane which is coincident with the axis of said gear and extends normal to the axis of said worm, said meshing portions of the worm and gear being located with respect to said plane at a distance further than the closest point to the axis of said gear of the locus of points of intersection of said conical surface of the worm with straight lines passing through said gear axis and extending normal to said conical surface of the worm.

6. A right angle skew axis gearing comprising a conically tapered worm having a thread of constant axial lead, and a face-type worm gear, said gear including teeth meshing with the thread of said worm, the meshing portions of said worm and gear being positioned between the apex of the conical surface of said worm and a plane which is coincident with the axis of said gear and extends normal to the axis of said worm, said constant axial lead being represented in accordance with the following formula, $$t = \frac{t' + t''}{2}$$

where $$t' = \frac{2\pi A}{n\left(\frac{i}{a} - b'\right)} \quad t' = \frac{2\pi A}{n\left(\frac{i}{a} - b''\right)}$$

$$a' = \frac{Z'}{Z' - (r - Z' \tan \delta_1) \tan \delta_1}$$

$$a'' = \frac{Z}{Z'' - (r - Z'' \tan \delta_1) \tan \delta_1}$$

$$b' = \frac{\{[Z' - (r - Z' \tan \delta_1) \tan \delta_1]^2 - A^2 \tan^2 \delta_1\}^{1/2}}{r - Z' \tan \delta_2}$$

$$b'' = \frac{\{[Z'' - (r - Z'' \tan \delta_1) \tan \delta_1]^2 - A^2 \tan^2 \delta_1\}^{1/2}}{r - Z'' \tan \delta_1}$$

where $i$ is the ratio between the number of wheel teeth and the number of worm threads;

A is the centre-to-centre distance of the gearing;

$n$ is the number of the worm threads;

$\delta_1$ is one-half angle at the apex of the cone of the worm wheel;

$r$ is the distance from the point, where the worm frustum surface intersects the common perpendicular, to the worm axis; and $Z'$ and $Z''$ are the respective distances between the common perpendicular and the planes perpendicular to the worm axis at the ends of larger and smaller diameter respectively.

References Cited by the Examiner

UNITED STATES PATENTS 2,935,885   5/1960   Saari _____ 74—427 X

DAVID J. WILLIAMOWSKY, *Primary Examiner.*

DON A. WAITE, *Examiner.*

R. J. BIRD, L. H. GERIN, *Assistant Examiners.*